United States Patent [19]

Oge

[11] Patent Number: 4,549,069

[45] Date of Patent: Oct. 22, 1985

[54] ELECTRICALLY HEATED STEERING WHEEL COVER

[76] Inventor: Eray Oge, Clamshell La., Northport, N.Y. 11768

[21] Appl. No.: 610,197

[22] Filed: May 14, 1984

[51] Int. Cl.[4] .......................... H05B 3/52; H05B 1/02; B62D 1/06
[52] U.S. Cl. ..................................... 219/204; 74/557; 219/528; 219/535
[58] Field of Search ....................... 219/204, 535, 528; 174/557

[56] References Cited

U.S. PATENT DOCUMENTS

| 1,168,146 | 1/1916 | Barnes | 219/204 X |
| 1,934,988 | 11/1933 | May | 219/204 |
| 2,662,961 | 12/1953 | Sargent | 219/204 |

FOREIGN PATENT DOCUMENTS

| 2951871 | 2/1981 | Fed. Rep. of Germany | 219/204 |
| 1179895 | 2/1970 | United Kingdom | 219/204 |

Primary Examiner—A. Bartis
Attorney, Agent, or Firm—Leonard Belkin

[57] ABSTRACT

An electrically heated cover for the steering wheel of an automobile, truck, power boat, aircraft, and the like, which is readily snapped onto the outside of the rim of the wheel. The cover includes an annularly extending sleeve parted along a line facing and parallel to the rim of the steering wheel to permit the sleeve to be readily mounted and removed. The sleeve is comprised of inner and outer separated covers joined at both parting edges and contains an array of electric heating elements arranged in parallel and embedded in layer of thermally conductive, electrically insulative material. A layer of thermal insulation is disposed within the covers between the heating elements and inner cover for inhibiting the flow of heat into the steering wheel. Electric power is supplied to the electric heating element through the circuitry to a horn switch on the steering wheel and is controlled by an illuminated switch on a horn cover on the wheel. The switch may include a timer for limiting the period of operation of the heating elements.

3 Claims, 3 Drawing Figures

ELECTRICALLY HEATED STEERING WHEEL COVER

BACKGROUND OF THE INVENTION

This invention relates to a heated steering wheel cover for vehicles and more particularly to a steering wheel cover which is easy and convenient to mount on an existing vehicle and is of improved effectiveness and efficiency.

Previous attempts to provide heating for the steering wheels of vehicles such as automobiles, trucks, aircraft, and boats involve elaborate provision for incorporating such features in steering wheels at the time of their design and fabrication or modifying their construction later to incorporate the heating systems, as shown in U.S. Pat. Nos. 1,934,988, 2,018,947, 2,537,606, and 2,835,777. Other efforts were directed to providing add-on features to produce such heating as shown in U.S. Pat. Nos. 1,230788 and 1,546,413.

In all such previous attempts, the designs were highly inefficient in that excessive power consumption was required due to the flow of substantial amounts of heat down into the steering column of the vehicle. In addition, as will be noted from the patents identified above even in those designs where the arrangements are capable of being added to existing steering wheels, they are either or both inconvenient to mount or use and remove.

SUMMARY OF THE PRESENT INVENTION

The present invention provides a heated steering wheel cover which is readily mountable and removable, reduces substantially the need for electric power and is convenient to control and use.

A preferred embodiment of this invention consists of an electrically heated cover for a steering wheel. The cover is in the shape of an annularly extending cylindrical sleeve parted along a line on said sleeve facing and parallel to the rim of the steering wheel to be mounted on and enclose said rim. The sleeve contains an array of electrically energized heating elements and thermal insulation disposed between the heating elements and the rim when the sleeve is mounted in order to inhibit the flow of heat into the steering wheel and the steering column.

Such an arrangement reduces substantially the power requirements for heating the cover, and it is also seen that the cover is readily mountable and removable with a minimum of effort.

To supply electrical current to the cover, the latter is provided with a plug member. The cooperating plug member is conveniently located on or adjacent the wheel attached at any suitable location such as the underside of one of the spokes. Wiring of the cooperating plug member can be accomplished in a number of ways including the use of the hot wire for the horn within the steering wheel itself. A separate fuse and a switch also would be conveniently located.

It is thus a principal object of this invention to provide a readily and conveniently mountable heated cover for a steering wheel with reduced power requirements. Other objects and advantages of this invention will hereinafter become obvious from the following description of preferred embodiments of this invention.

DESCRIPTION OF THE PREFERRED EMBODIMENT

Figure 1:
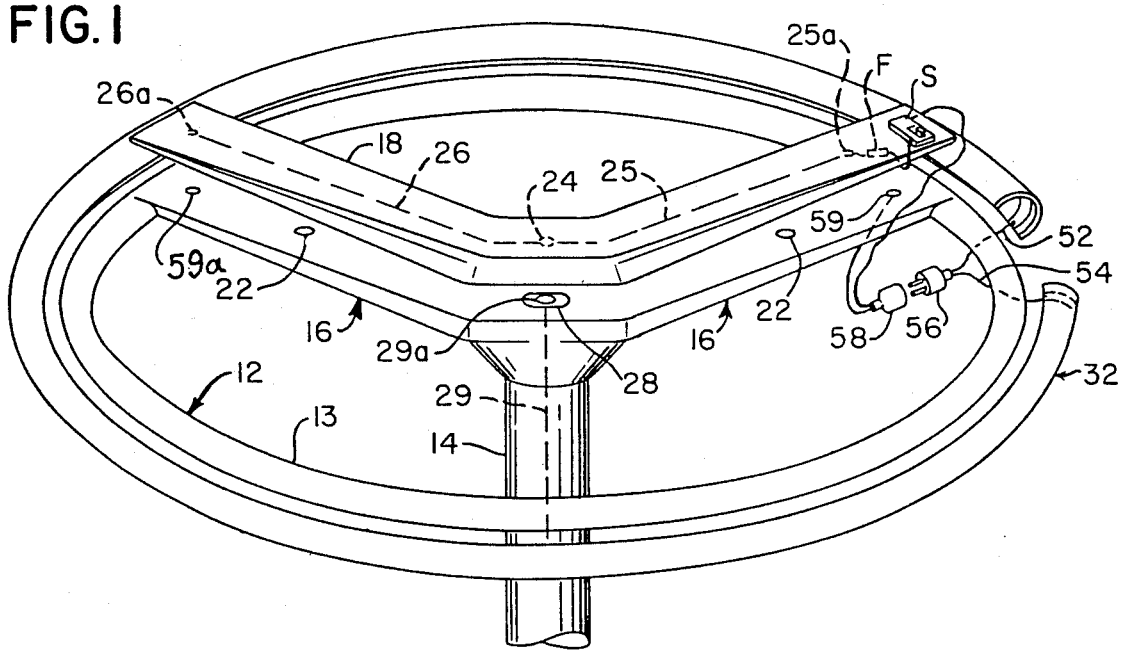
FIG. 1 is an isometric, partially expanded view of the steering wheel with a sleeve embodying the principles of this invention spread apart and about to be mounted on the rim.

Referring to FIG. 1, there is shown a steering wheel 12 with a rim 13 mounted on a steering column 14 and supported by a pair of spokes 16. This arrangement is typical of what is found in automobiles, trucks, power boats, and certain kinds of aircraft.

Horn cover 18, shown removed, is normally held in place by screws which pass through prepared openings 22 in spokes 16 from underneath into tapped holes on the underside of cover 18. On the underside of cover 18 is a center contact 24 from which radiates a pair of conductors 25 and 26 terminating in horn switch contacts 25a and 26a, respectively. An opening 28 into steering column 14 is provided to permit conductor 29 from the horn and source of voltage to pass and terminate in a contact 29a which normally would be engaged with contact 24 on the underside of cover 18.

As is common practice, horn cover 18 is spring mounted so that when it is depressed either horn switch contact 25a or contact 26a is grounded on a spoke 16 which is of metal construction or has grounding elements 59 and 59a opposite contacts 25a and 26a. Spring biasing prevents such contact except when cover 18 is depressed at either end. It is understood that other horn switch arrangements may be employed such as the use of horn buttons (not shown) passing through openings in cover 18 in which case the latter is immoveable and the buttons are biased away from contacts underneath. In the use of buttons, the hot wiring from the horn would extend to contacts under the buttons.

Figure 2:
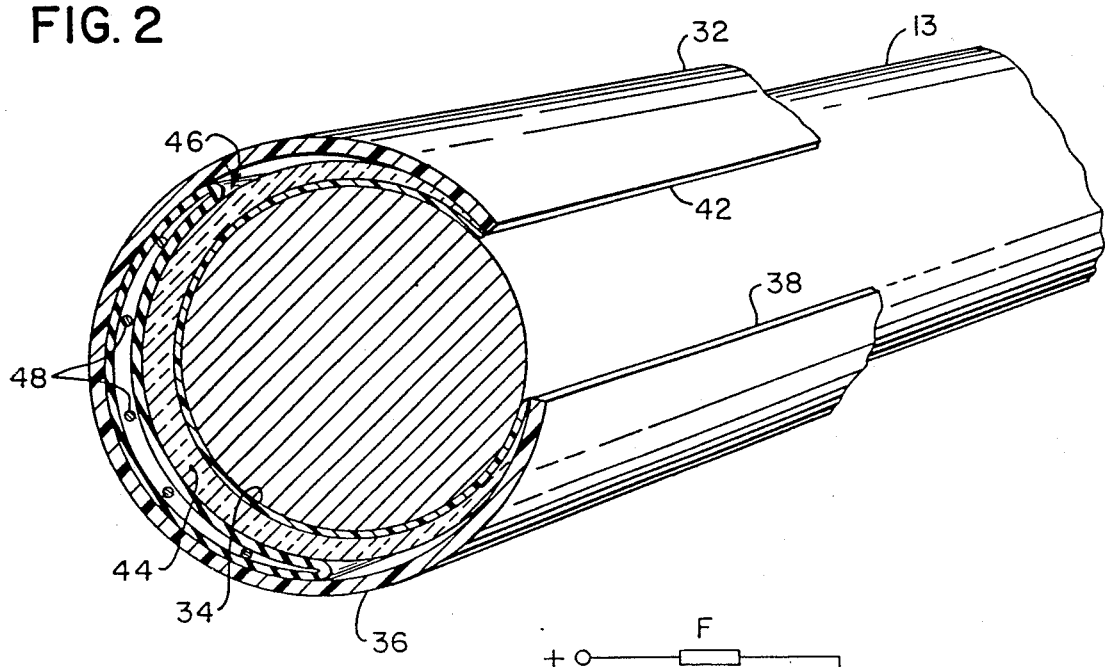
FIG. 2 is a section across the rim with the cover mounted.

Heated cover embodying the principles of this invention, as best seen in FIG. 2, consists of an annularly extending cylindrical sleeve 32 made up of an inner layer 34 and an outer layer 36 slit or parted along a line parallel to rim 13 forming a pair of edges 38 and 42 where layers 34 and 36 come together and are attached to each other by any convenient means such as by heat welding where the material is a thermoplastic material or by stitching in the cases of other types of material. Inner and outer layers 34 and 36 are otherwise separate as illustrated and contain structure as will hereinafter be described.

Within sleeve 32 between layers 34 and 36 is a layer 44 of thermal insulation such as fiberglass immediately adjacent inner layer 34.

Figure 3:
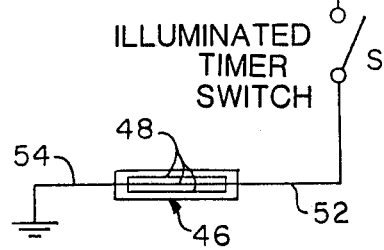
FIG. 3 is a schematic showing the electric circuitry for the embodiment of FIGS. 1 and 2.

Between layers 36 and 44 is an extending heating assembly 46 shown somewhat schematically in FIG. 3. Assembly 46 consists of a sandwich of silicone fabric which has good thermal heat transfer properties, is electrically insulating, and is fireproof, in which is embodied electric resistance wires 48 of the type generally employed in electrical defrosters or defoggers commonly employed mounted on the rear windows of automotive vehicles.

Assembly 46 is stretched out as shown in FIG. 2 within sleeve 32 adjacent outer layer 36 so it is seen that insulating layer 44 inhibits the flow of heat into rim 13 and steering wheel column 14 and maintains, when in operation, the outer surface of sleeve 32 at an elevated temperature.

As seen in FIG. 1, sleeve 32 is provided with a pair of electrical leads 52 and 54 terminating in a male plug 56 for engagement with a female plug 58 grounded at contact 59 and which would be mounted on steering wheel 12 in any convenient location such as under a spoke 16 or under horn cover 18 if there is room. An electrical illuminated push button switch S of conventional design can be located on cover 18, held there by a suitable stickable material commonly in use, and is pushed successively to close and open it. Switch S would be illuminated when in the closed position as is understood in the art, and may include a timer limiting its closed position to some finite time such as ten minutes to avoid battery discharge when inadvertently left on which the automobile not in operation. Such switches are in use now for defrosters, for example, and their design does not form a part of this invention. As seen in FIG. 3, heating elements 48 in assembly 46 are connected through switch S and a fuse F to the power source of the vehicle, customarily 12 volts. Fuse F would be placed in any convenient location such as under horn cover 18, connected to conductor 25.

The hot wire 52 for sleeve 32 would be connected to the high voltage line of the horn at opening 28 into the steering column 14.

It will be noted in effect that the wiring for heated steering wheel sleeve 32 is in series to that of the horn of the vehicle. When switch S is activated to warm sleeve 32, due to the relatively high resistance or relatively infinite resistance of wires 48, current flow is at such a low value that the horn will not be activated. Should horn cover 18 be depressed, however, when sleeve 32 is activated, the latter is short circuited and the horn will operate.

In those cases where the horn design is such that the horn will be activated when switch S is in the ON position, it would then be necessary to run a separate wire through the steering column to a separate contact for the high voltage. Steering columns are designed to be opened conveniently and such an installation would present no problem.

In the operation of the system just described sleeve 32 is separated at its ends as shown in FIG. 1 and superimposed on rim 13 as shown in FIG. 2. Plug 56 is jacked into plug 58 which press-contacts on wheel 12 at some convenient location and switch S is depressed whenever heating is desired.

While not shown it is understood that a thermostat may be employed as is understood in the art embedded somewhere within outer layer 36. It is also understood and it may be desired under certain circumstances to embed one or more stiffening wires within sleeve 32 to maintain its shape, or that suitable connectors with snaps may be employed joining edges 38 and 42 to hold sleeve 32 in place.

It is thus seen that there has been provided an improved and efficient arrangement for providing heating in the rim of a steering wheel under conditions where such is needed or desired.

While only a preferred embodiment of this invention has been described it is understood that many variations of the preferred embodiment are possible without departing from the principles of this invention as set forth in the claims which follow.

What is claimed is:

1. An electrically heated cover for a steering wheel having a rim, a horn switch and a horn cover, comprising an annularly extending cylindrical sleeve parted along a line on said sleeve facing and parallel to the rim of the steering wheel thereby permitting said sleeve to be readily mounted on and partially enclose the rim, said sleeve being comprised of inner and outer sparated covers which are joined where said sleeve is parted, said sleeve containing an array of electrically energized heating elements between said covers arranged in parallel and embedded in a layer of thermally conductive, electrically insulating material, thermal insulation disposed between said heating elements and said inner cover which is adapted to contact the rim when said sleeve is mounted on the rim, means for supplying electrical current through the circuitry of the horn switch to said heating elements to heat said sleeve, said thermal insulation inhibiting the flow of heat into said steering wheel, and an illuminated switch adapted to be mounted on the horn cover to energize said heated cover.

2. The heated cover of claim 1 in which said thermally conductive layer is also of fireproof material.

3. The heated cover of claim 2 wherein said illuminated switch includes a timer.

* * * * *